United States Patent
Paek et al.

(10) Patent No.: US 6,307,993 B1
(45) Date of Patent: Oct. 23, 2001

(54) OPTICAL FIBER FOR WAVELENGTH DIVISION MILTIPLEXING COMMUNICATIONS

(75) Inventors: Un-Chul Paek, Kwangju; Kyung-Hwan Oh; Ghie-Hugh Song, both of Seoul; Xiao-Jun Li, Kwangju; Ki-Un Namkoong, Daegu; Seung-Hun Oh, Kumi, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/152,503

(22) Filed: Sep. 14, 1998

(30) Foreign Application Priority Data

Sep. 13, 1997 (KR) .................................................. 97-47450

(51) Int. Cl.$^7$ ...................................................... G02B 6/22
(52) U.S. Cl. ........................... 385/127; 385/123; 385/126; 385/127
(58) Field of Search ..................................... 385/124, 126, 385/127, 123, 128; 359/161

(56) References Cited

U.S. PATENT DOCUMENTS

| | | | |
|---|---|---|---|
| 4,070,091 | * 1/1978 | Taylor et al. | 385/31 |
| 4,715,679 | 12/1987 | Bhagavatula . | |
| 4,755,022 | * 7/1988 | Ohashi et al. | 385/127 |
| 5,483,612 | * 1/1996 | Gallagher et al. | 385/127 |
| 5,675,688 | * 10/1997 | Nouchi et al. | 385/124 |
| 5,703,986 | * 12/1997 | Brehm et al. | 385/123 |
| 5,835,655 | * 11/1998 | Liu et al. | 385/124 |
| 5,956,448 | * 9/1999 | Smolka et al. | 385/124 |

* cited by examiner

Primary Examiner—Hemang Sanghavi
(74) Attorney, Agent, or Firm—Robert E. Bushnell, Esq.

(57) ABSTRACT

An optical fiber for wavelength division multiplexing (WDM) communications, includes: an inner core having a predetermined refractive index, formed to a first predetermined radius from a central axis of the optical fiber, an outer core having a refractive index which is lower than the refractive index of the inner core and gets linearly smaller from its inner side to its outer side, formed on an outer side of the inner core to have a second predetermined radius, and a cladding formed on an outer side of the outer core to have a third predetermined radius.

13 Claims, 4 Drawing Sheets

OPTICAL FIBER FOR WAVELENGTH DIVISION MILTIPLEXING COMMUNICATIONS

This application makes reference to, incorporates the same herein, and claims all benefits accruing under 35 U.S.C. §119 from an application for OPTICAL FIBER FOR WAVELENGTH DIVISION MULTIPLEXING COMMUNICATIONS earlier filed in the Korean Industrial Property Office on the 13$^{th}$ of Sep. 1997 and there duly assigned Ser. No. 47450/1997.

BACKGROUND OF THE INVENTION

1. Field of the Invention

The present invention relates to an optical fiber for wavelength division multiplexing (WDM) communications, and more particularly, to an optical fiber having a profile which optimizes chromatic dispersion in a desired wavelength band by adjusting the refractive index of an optical waveguide.

2. Description of the Related Art

In general, WDM communications transmits a plurality of optical signals having different wavelengths via an optical fiber, and can effectively use the low loss characteristics of an optical fiber over a wide wavelength band. Thus, at present, communications techniques using WDM are being used more widely.

It is known that an optical fiber, which is the most widely used in the above WDM communications, must have a wide communications region to transmit a signal having a 1550 nm wavelength band. As an advantage, an optical fiber having a communications region in the wavelength band of 1550 nm has low attenuation, since light in the wavelength band of 1550 nm is attenuated the least when propagating the core of a optical fiber according to the characteristics of a silica optical fiber. Accordingly, when communications is made using an optical fiber having a transmission region capable of transmitting the 1550 nm wavelength band signal, repeaters can be spaced widely apart, thereby drastically reducing costs for maintenance and repair for long distance transmission.

As another advantage, optical communications of the 1550 nm wavelength band signal can amplify an optical signal using an optical fiber itself. Such optical amplification can not only reduce the size of an external amplifier but also does not require an external generator, so that the size of a transmission system can be remarkably diminished as well.

For example, a dispersion shifted fiber (DSF) is commonly used of late as an optical fiber having a communications region of the 1550 nm wavelength band. The DSF, having chromatic dispersion of "0" in a wavelength of 1550 nm, is effectively used to transmit a 1550 nm-wavelength signal. A representative example of such a DSF is disclosed in U.S. Pat. No. 4,715,679 entitled "Low-dispersion Low-Attenuation Single Mode Optical Waveguide" by Venkata A.Bhagavatula.

Also, an optical amplifier uses a rare earth ion doped fiber formed by doping a rare earth material to the core of an optical fiber. The rare earth material is generally erbium, neodymium or praseodymium. An erbium doped fiber amplifier (EDFA), where erbium among the rare earth materials is doped to the core, is the most widely used, and allows an optical communications network to be realized.

The EDFA has characteristics representing a maximum gain at a wavelength band of 1530 nm, and it is known that a wavelength band capable of using the amplification effect is usually, approximately between 1530 nm and 1565 nm. As to a current optical fiber and an optical communications technique using the same, much effort is made to widen a wavelength band which can sufficiently utilize the amplification properties of the EDFA and to flatten the difference between gains over wavelength bands.

At present, single mode optical fibers for WDM communications are manufactured so that the inclination of chromatic dispersion and a zero dispersion wavelength are suitable for a wavelength of 1550 nm. However, in this case, this WDM communications single mode fiber is limited with respect to multi-channel transmission because of nonlinear effects such as four-wave mixing, and the multichannel transmission is more difficult since the wavelength band of the optical fiber is not equal to a gain wavelength region of the EDFA. Also, in the optical fibers having a zero dispersion wavelength set to 1550 nm, the inclination of the chromatic dispersion is not consistent with the gain wavelength band of the EDFA. As described above, the optical fibers having a zero dispersion wavelength cause a limit where transmission quality is precipitously deteriorated even when there is little change in the inclination of chromatic dispersion.

In order to suppress an increase in the aforementioned nonlinear effect, an optical fiber must have the characteristics in which zero dispersion is not made in the gain wavelength band of the EDFA by controlling chromatic dispersion of the optical fiber. That is, the optical fiber is designed to have characteristics in which zero dispersion is not made in a wavelength region of between 1350 nm and 1560 nm, in order to minimize or remove the nonlinear effect such as the four-wave mixing in the gain wavelength region of the current EDFA.

SUMMARY OF THE INVENTION

To solve the above problems, it is an objective of the present invention to provide an optical fiber having a profile which allows the optical fiber to receive relatively little influence due to external tension or stress by having a flat refractive index at the core center of the optical fiber and reducing the diameter of the core.

It is another objective of the present invention to provide an optical fiber having a relatively wide non-zero dispersion region to minimize a nonlinear effect in a gain wavelength region of an erbium doped fiber amplifier (EDFA).

Accordingly, to achieve the first objective, there is provided an optical fiber for wavelength division multiplexing (WDM) communications, comprising: an inner core having a predetermined refractive index, formed to have a first predetermined radius from a central axis of the optical fiber; an outer core having a refractive index which is lower than the refractive index of the inner core and gets linearly smaller from its inner side to its outer side, formed on an outer side of the inner core to have a second predetermined radius; and a cladding formed on the outer side of the outer core to have a third predetermined radius.

To achieve the second objective, there is provided an optical fiber for wavelength division multiplexing (WDM) communications, comprising: an inner core having a predetermined refractive index, formed to have a first predetermined radius from the central axis; an outer core having a refractive index which is lower than the refractive index of the inner core and gets linearly smaller from its inner side to its outer side, formed on an outer side of the inner core to have a third predetermined radius; an inner cladding formed on the outer side of the outer core to have a third predetermined radius; and an outer cladding having a refractive index which is lower than the refractive index of the inner cladding and gets linearly smaller from its inner side to its outer side, formed on an outer side of the inner cladding to have a fourth predetermined radius.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
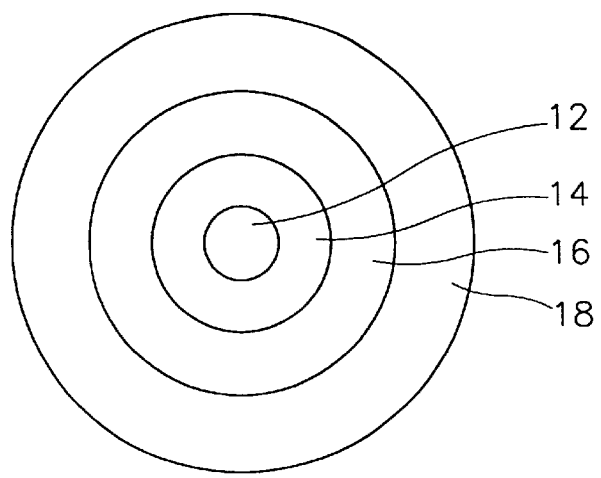
FIG. 1 shows a cross-section of a wavelength division multiplexing (WDM) communications fiber according to the present invention.

To prevent the gist of the present invention from becoming unclear, only descriptions necessary to understand the operation according to the present invention are provided below, and the remainder will not be described FIG. 1 shows a cross-section of a wavelength division multiplexing (WDM) communications fiber according to the present invention. Referring to FIG. 1, the WDM optical fiber has an inner core 12 having a diameter of a0 formed in the center. An outer core 14 having a diameter of b0 (here, b0>a0) is deposited on the outer surface of the inner core 12. Inner and outer claddings 16 and 18 are formed on the outer surface of the outer core 14. The WDM optical fiber having the structure as shown in FIG. 1 is formed by sequentially depositing the outer cladding 18 through the inner core 12 using modified chemical vapor deposition (MCVD) employing a deposition quartz tube.

The refractive index of the inner core 12 shown in FIG. 1 is constantly $n_1$, and the outer core 14 has a profile structure in which the refractive index $n_2$ gets linearly smaller from the inner side of the outer core 14 to the outer side thereof. Such a profile structure can be easily understood referring to FIG. 2.

Figure 2:
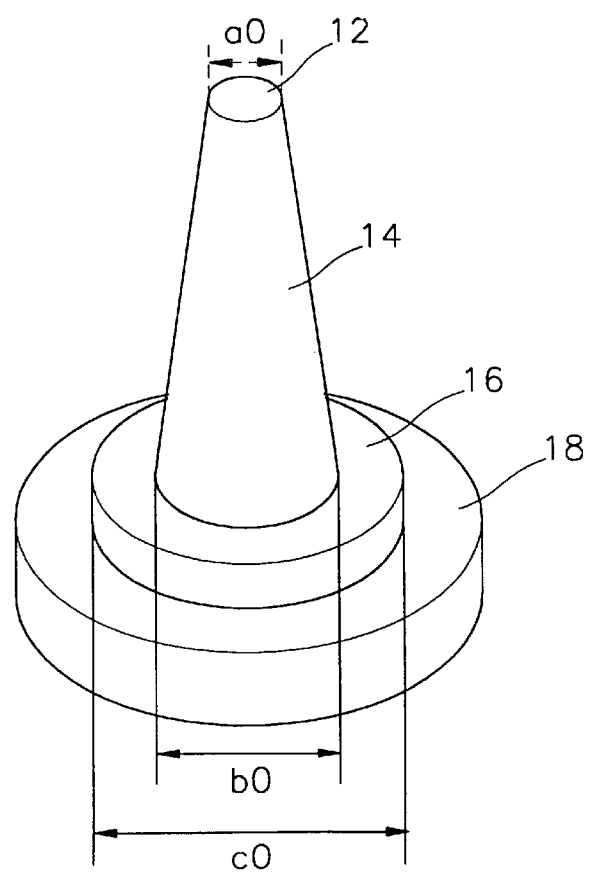
FIG. 2 shows an index profile of a wavelength division multiplexing (WDM) communications fiber according to the present invention.

FIG. 2 is an index profile of a WDM communications fiber according to the present invention. Referring to FIG. 2, an inner core 12 having a constant refractive index is formed to have a diameter of a0 from a center shaft. An outer core 14 of which refractive index is reduced in sequence from its inner side to outer side is formed to a diameter of b0 on the outer side of the inner core 12. An inner cladding 16 having a lower refractive index than a minimum refractive index of the outer core 14 is formed to a diameter of c0 on the outer side of the outer core 14. An outer cladding 18 having a significantly lower refractive index than the refractive index of the inner cladding 16 is formed on the outer side of the inner cladding 16.

Figure 3:
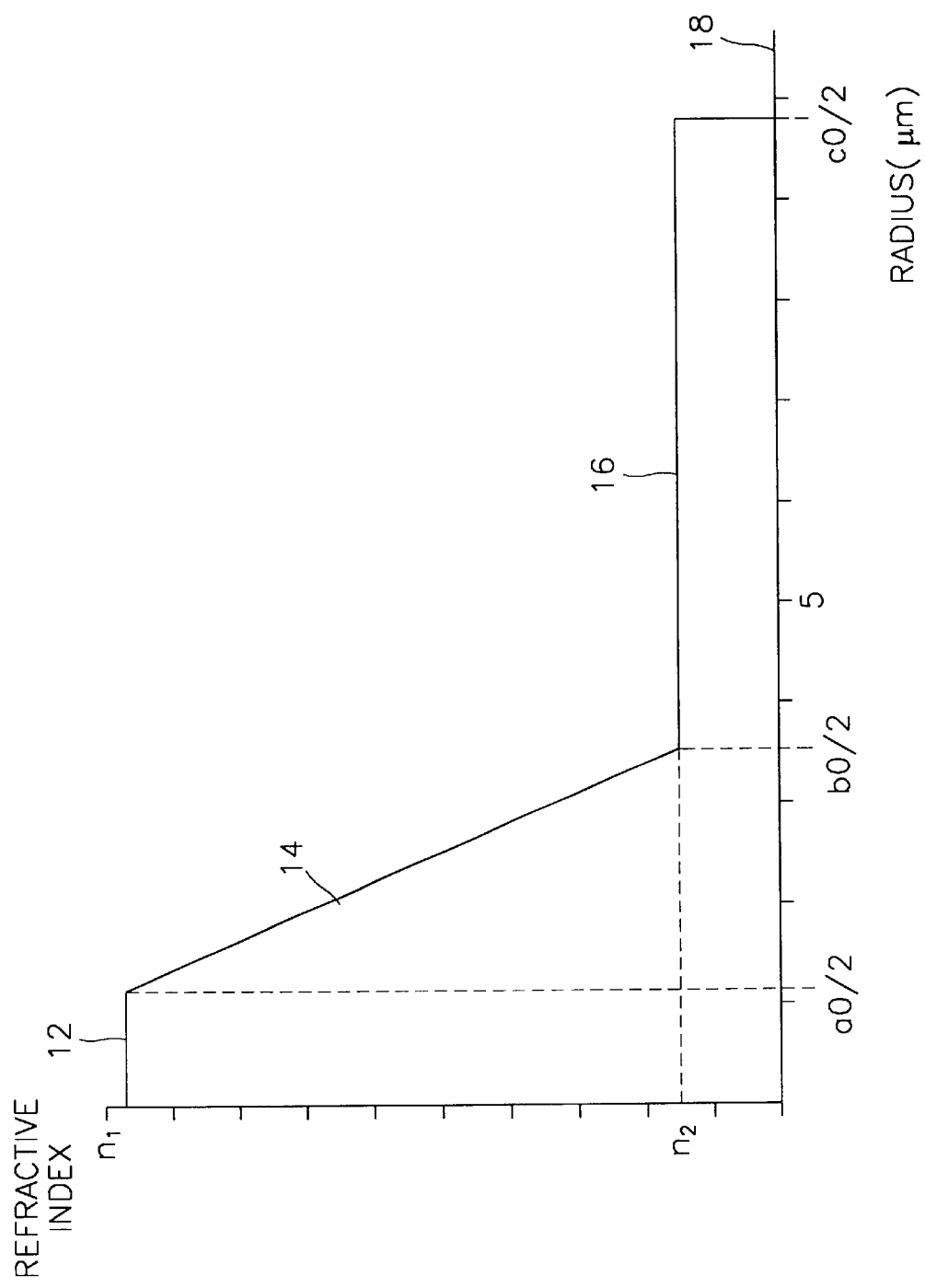
FIG. 3 is a graph illustrating the characteristics of the refractive index of a wavelength division multiplexing (WDM) communications fiber according to the present invention.

FIG. 3 is a graph illustrating the characteristics of the refractive indices of the inner core 12, the outer core 14, and inner and outer claddings 16 and 18 of the WDM communications fiber according to the present invention. Here, the horizontal axis indicates the radius ($\mu$m) of an optical fiber, and the vertical axis indicates the refractive index. In the present invention, a distribution of the refractive index of the inner core 12 is horizontal, and the refractive index of the outer core 14 is lowered in sequence from its center to its outer side.

The profile structure of a WDM optical fiber according to a preferred embodiment of the present invention, and the characteristics thereof will now be described in detail.

The WDM optical fiber having the profile structure of FIGS. 1 and 2 has a non-zero dispersion (NZD) region over a wide wavelength region, e.g., over a wavelength region of between 1530 nm and 1570 nm, by reducing the diameter of a core including both the inner and outer cores 12 and 14 and increasing the refractive index thereof. Also, the WDM optical fiber flattens the refractive index of the center of its core and reduces the diameter of the core to prevent itself from being greatly influenced by external tension or stress.

Figure 4:
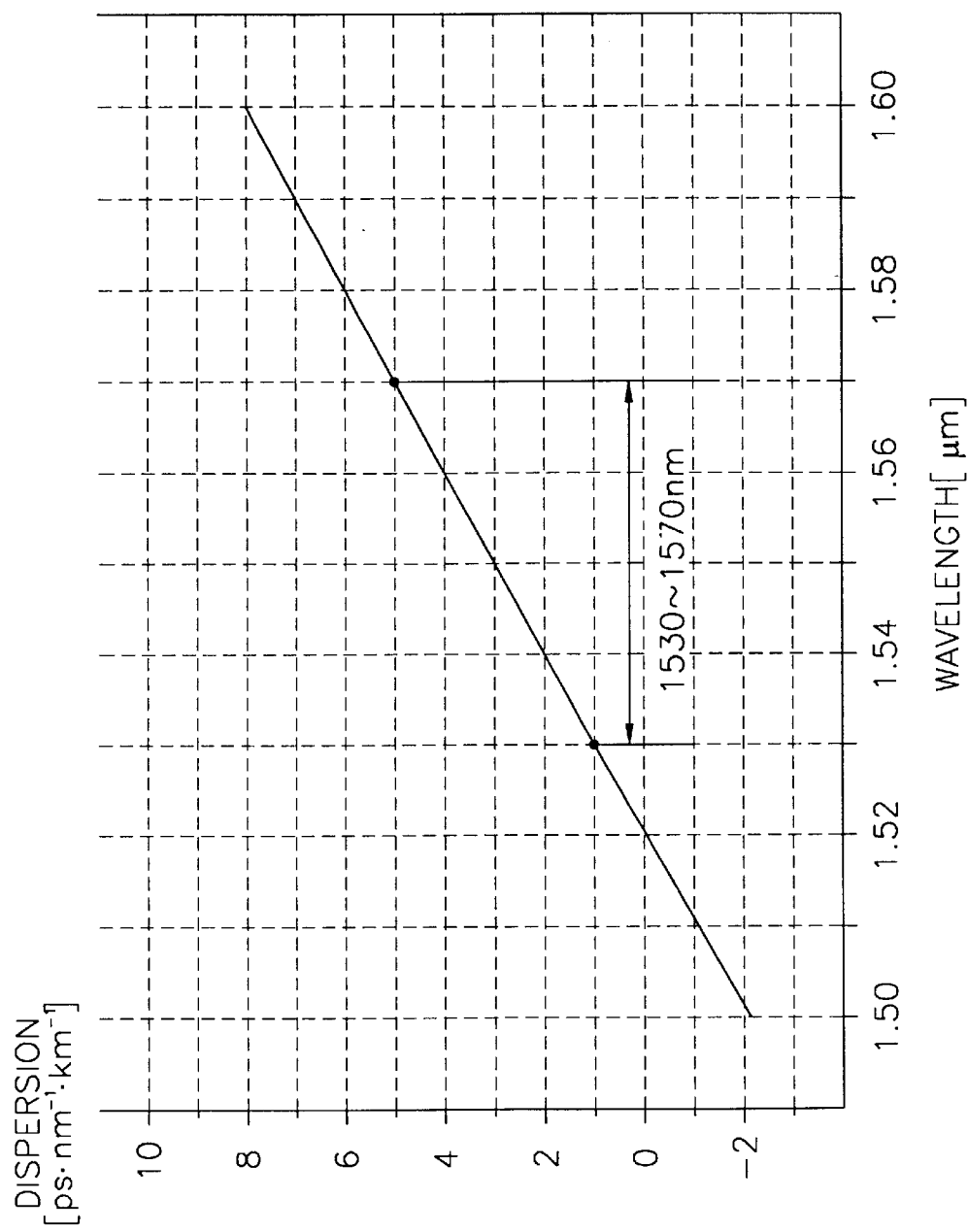
FIG. 4 is a graph illustrating the characteristics of dispersion and gain with respect to wavelengths of a wavelength division multiplexing (WDM) communications fiber according to the present invention.

FIG. 4 is a graph illustrating the characteristics of dispersion and gain with respect to wavelengths of a WDM communications fiber according to the present invention. The NZD region according to the present invention corresponds to a wavelength region of between 1530 nm and 1570 nm, and a 1550 nm wavelength band has a dispersion value of 2.0 ps nm$^{-1}$ Km$^{-1}$ or more.

The WDM communications fiber has a profile of a higher refractive index and a smaller core diameter than a general single mode optical fiber, and most optical characteristics thereof are determined by the diameter and refractive index of its core. Accordingly, the diameter and refractive index of the core must make small changes in order to obtain consistent optical characteristics. Comparing an optical fiber having a profile according to the present invention to an optical fiber having a triangular profile structure having a maximum refractive index at the center of the core, a change of characteristics of the former due to a change in the core diameter and the core refractive index is smaller than that of the latter. That is, according to the present invention, since the change in the core refractive index is very small with respect to the change in the core diameter, changes to the entire optical characteristics are small.

Meanwhile, a cut-off wavelength must be relatively great in order to obtain optical characteristics which are not sensitive to influence due to bending. In order to increase a cut-off wavelength value, the core diameter must be changed, or the core structure must be a step type. The present invention has a structure where the refractive index of the outer core is gradually reduced, so that loss property is improved because of a triangle structure, and a relatively large cut-off wavelength is obtained by the large lower diameter of the outer core.

Figure 5:
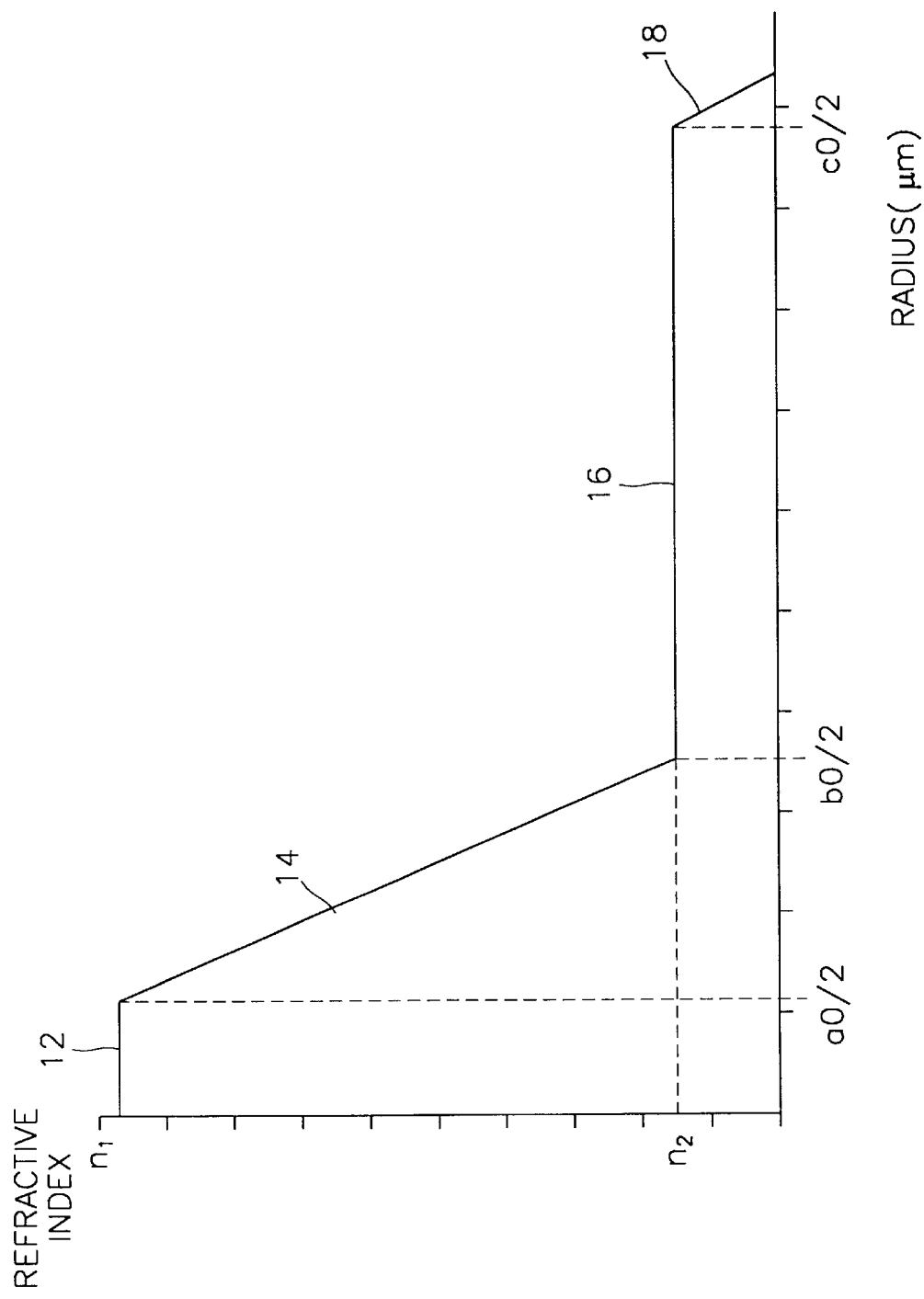
FIG. 5 is a graph illustrating the characteristics of the refractive index of a wavelength division multiplexing (WDM) communications fiber having a different profile, according to the present invention.

FIG. 5 is a graph illustrating a different profile of a WDM communications fiber according to the present invention. Here, the horizontal axis indicates the radius ($\mu$m) of an optical fiber, and the vertical axis indicates the refractive index, sequentially showing the refractive indices of the inner core 12, the outer core 14, the inner cladding 16 and the outer cladding 18 from the center of the optical fiber. In the optical fiber shown in FIG. 5, the refractive index of the outer cladding 18 is reduced at a predetermined inclination, compared to the optical fiber shown in FIG. 3.

The residual stress increases due to a difference in viscosity caused by a difference in component composition between the cladding and the core of an optical fiber, thus increasing loss. However, the present invention has a structure where the refractive indices of the outer cladding and the outer core gradually decreases, to thus reduce the sharp viscosity difference between the core and the cladding. Accordingly, the residual stress due to the viscosity difference is reduced, to thus acquire low loss optical characteristics.

In an embodiment of the present invention, it is preferable that the inclination of the refractive index of the outer core 14 is the same as that of the outer cladding 18. In particular, when the inclination is between 0.003 and 0.005, more preferable optical properties, e.g., a wider NZD region or a larger cut-off wavelength, can be obtained. Here, the inclination of refractive index is expressed by the following Equation 1:

$$\text{inclination of refractive index} = \frac{\text{difference in refractive index}}{\text{diameter } (\mu m) \text{ of optical fiber}} \quad (1)$$

According to the present invention as described above, a core region is formed as a multi-core type where a core is divided into at least two cores, wherein the profile of the refractive index of the center of the core is flat but the profile of the refractive index of the core region at the outer side of the center decreases linearly. Thus, a chromatic dispersion inclination is low in the gain wavelength region of an EDFA, which widens the wavelength band capable of WDM transmission. Channel spacing can be widened during multiplexing, and many transmission wavelengths can be used, which increases the capacity for communications. Also, the present invention can have a relatively high cut-off wavelength, thus reducing the influence of external tension or stress. Loss is reduced by decreasing a residual stress due to a viscosity unbalance between a cladding and a core.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical fiber for wavelength division multiplexing (WDM) communications, comprising:
    an inner core having a predetermined refractive index, formed to have a first predetermined radius from a central axis of the optical fiber;
    an outer core having a refractive index that is lower than the refractive index of the inner core and getting linearly smaller from its inner side to its outer side, formed on an outer side of the inner core to have a second predetermined radius; and
    an inner cladding formed on the outer side of the outer core to have a third predetermined radius;
    an outer cladding having a refractive index that becomes linearly smaller from its inner side to its outer side, formed on an outer side of the inner cladding;
    the optical fiber having a dispersion value in a range of 2.0 to 4.0 ps nm$^{-1}$ Km$^{-1}$ in a 1550 nm wavelength band.

2. The optical fiber of claim 1, the cladding comprising:
    said inner cladding having a lower refractive index than a minimum refractive index of the outer core; and
    said outer cladding having a lower refractive index than the inner cladding.

3. An optical fiber for wavelength division multiplexing (WDM) communications, comprising:
    an inner core having a predetermined refractive index, formed to have a first predetermined radius from a central axis of the optical fiber;
    an outer core having a refractive index which is lower than the refractive index of the inner core and getting linearly smaller from its inner side to its outer side, formed on an outer side of the inner core to have a second predetermined radius;
    an inner cladding formed on an outer side of the outer core to have a third predetermined radius; and
    an outer cladding having a refractive index which is lower than the refractive index of the inner cladding and gets linearly smaller from its inner side to its outer side, formed on an outer side of the inner cladding to have a fourth predetermined radius;
    the optical fiber having a dispersion value in a range of 2.0 to 4.0 psnm$^{-1}$ Km$^{-1}$ in a 1550 nm wavelength band.

4. The optical fiber as claimed in claim 3, an inclination of the refractive index of the outer core being the same as an inclination of the refractive index of the outer cladding.

5. The optical fiber as claimed in claim 3, an inclination of the refractive index of the outer core or cladding being in a range of 0.003 to 0.005.

6. A method for decreasing the sensitivity of a WDM optical fiber to influence from external stress and tension, said fiber having an inner core having an inner side and an outer side, an outer core and an inner cladding formed on the outer side of the outer core, said method comprising:
    selecting a fiber with a dispersion value from 2.0 to 4.0 ps nm$^{-1}$ Km$^{-1}$ at a wavelength of 1550 nm;
    selecting the inner core to have a predetermined refractive index $R_i$; and
    selecting the outer core to have a refractive index Ro such that (i) $R_o<R_i$, and (ii) $R_o$ decreases linearly from the inner side of the outer core to the outer side of the outer core; and
    an outer cladding having a refractive index that becomes linearly smaller from its inner side to its outer side, formed on an outer side of the inner cladding.

7. The method of claim 6, further comprising:
    said inner cladding having a lower refractive index than a minimum refractive index of the outer core; and
    said outer cladding having a lower refractive index than the inner cladding.

8. In a method for transmitting via an optical fiber a plurality of optical signals of different wavelengths in the 1550 nm wavelength band, the method comprising feeding the plurality of signals to a fiber comprising:
    an inner core having a predetermined refractive index $R_i$;
    an outer core having an inner side and an outer side, said outer core having a refractive index Ro such that $R_o<R_i$;
    a cladding formed on the outer side of the outer core;
    $R_o$ decreasing linearly from the inner side of the outer core to the outer side of the outer core;
    an inner cladding formed on an outer side of the outer core; and an outer cladding that becomes linearly smaller from its inner side to its outer side, formed on an outer side of the inner cladding;

the improvement comprising:

the fiber having a dispersion value in a range of 2.0 to 4.0 ps nm$^{-1}$ km$^{-1}$ in said 1550 nm wavelength band.

9. The method of claim 8, further comprised of:

said inner cladding having a lower refractive index than a minimum refractive index of the outer core; and said outer cladding having a lower refractive index than the inner cladding.

10. The fiber of claim 9, wherein said means for decreasing the sensitivity of the fiber to influence from external stress and tension, comprises:

the fiber having a dispersion value in a range of 2.0 to 4.0 ps nm$^{-1}$ Km$^{-1}$ in a 1550 nm wavelength band; and $R_o$ such that it decreases linearly from the inner side of the outer core to the outer side of the outer core.

11. The fiber of claim 10, further comprising:

said inner cladding having a lower refractive index than a minimum refractive index of the outer core; and said outer cladding having a lower refractive index than the inner cladding.

12. In an optical fiber for WDM communication, comprising:

an inner core having a predetermined refractive index $R_i$;

an outer core having an inner side and an outer side, said outer core having a refractive index $R_o$ such that $R_o < R_i$; and an inner cladding formed on the outer side of the outer core;

the improvement comprising:

said fiber having means for decreasing the sensitivity of the fiber to influence from external stress and tension; and an outer cladding having a refractive index that becomes linearly smaller from its inner side to its outer side, formed on an outer side of the inner cladding.

13. A method for manufacturing a wave division multiplexing (WDM) optical fiber in which sensitivity to influence from external stress and tension is lessened, said method comprising the steps of:

(1) providing an inner core with a predetermined refractive index $R_i$, said inner core having an outer surface;

(2) depositing an outer core on the outer surface of the inner core, said outer core having an outer-core inner side and an outer-core outer side, said outer core having a predetermined refractive index $R_o$, where $R_o < R_i$ and $R_o$ decreases linearly from the outer-core inner side to the outer-core outer side, whereby $R_o$ has a minimum value $R_{o\text{-}min}$ at the outer-core outer side;

(3) forming an inner cladding on the outer-core outer side, said inner cladding having a predetermined refractive index $R_{ic}$ less than $R_{o\text{-}min}$;

(4) forming an outer cladding on the inner cladding, said outer cladding having a predetermined refractive index $R_{oc}$, less than $R_{ic}$; and (5) carrying out the steps of the method so as to provide a WDM optical fiber that has a dispersion value from 2.0 to 40 ps nm$^{-1}$ km$^{-1}$ at a wavelength of 1550 nm; whereby a WDM optical fiber having a reduced sensitivity to influence from external stress and tension is provided.

* * * * *